United States Patent [19]

Doyle

[11] Patent Number: 4,519,509
[45] Date of Patent: May 28, 1985

[54] CLOTHES-LINE

[76] Inventor: Rexford Doyle, 135 Laurier St., North Alma, Quebec, Canada

[21] Appl. No.: 629,166

[22] Filed: Jul. 9, 1984

[30] Foreign Application Priority Data

Aug. 2, 1983 [CA] Canada .................................. 433708

[51] Int. Cl.³ ...................... B65G 25/00; D06F 53/00
[52] U.S. Cl. ............................... 211/119.13; 198/695; 254/394
[58] Field of Search ...................... 211/119.02, 119.11, 211/119.13; 198/695, 696, 650, 654; 226/173; 254/265, 372, 394; 24/489, 490, 536, 115 G; 271/204, 205, 206, 198; 104/115, 173 R

[56] References Cited

U.S. PATENT DOCUMENTS

| | | | |
|---|---|---|---|
| 1,861,282 | 5/1932 | Nelson | 198/650 X |
| 2,542,224 | 2/1951 | Werner | 24/536 |
| 2,586,632 | 2/1952 | Esposito | 211/119.02 |
| 2,815,864 | 12/1957 | Alexander | 211/119.02 |
| 2,845,186 | 7/1958 | Schwann | 211/119.11 |
| 3,100,637 | 8/1963 | Brown | 271/205 |
| 3,120,892 | 2/1964 | Henning et al. | 198/695 |
| 3,656,630 | 4/1972 | Miguel | 211/119.11 |
| 4,030,728 | 6/1977 | Wallace et al. | 198/695 X |
| 4,328,605 | 5/1982 | Hutchison et al. | 24/115 G |

FOREIGN PATENT DOCUMENTS 597524 11/1925 France .................................. 226/173

Primary Examiner—Stuart S. Levy
Assistant Examiner—Katherine Jaekel
Attorney, Agent, or Firm—Pierre Lespérance

[57] ABSTRACT

An endless clothes-line is trained onto pulleys in the usual manner and a sprocket wheel is located between the top and bottom run of the clothes-line and nearer one of the pulleys. Both ends of a cable are attached to the clothes-line. The cable carries spaced clothes pins and is trained on the sprocket wheel. The clothes pins clip onto the clothes-line and are made to disengage the same when travelling around the sprocket. Each clothes pin has a V-shape configuration with a circular notch at the apex of the space between the legs of the clothes pin. Each clothes pin has a transversely-slidable locking plate, also with a notch registering with the notch of the pin itself in the open position, so as to receive the clothes-line or the clothes-line with the garment draped thereon. The locking plate is spring biased to closed position. In this closed position, the locking plate protrudes from one side of the clothes pin. Movement of the line causes successive clothes pins to engage a V-shape recess at the periphery of the sprocket wheel, whereby the locking plate is caused to move to open position and release the clothes-line. Rotation of the sprocket wheel successively presents the clothes pins in open and operative position to the lower run of the line for automatically securing thereon the garments previously placed on the line.

4 Claims, 8 Drawing Figures

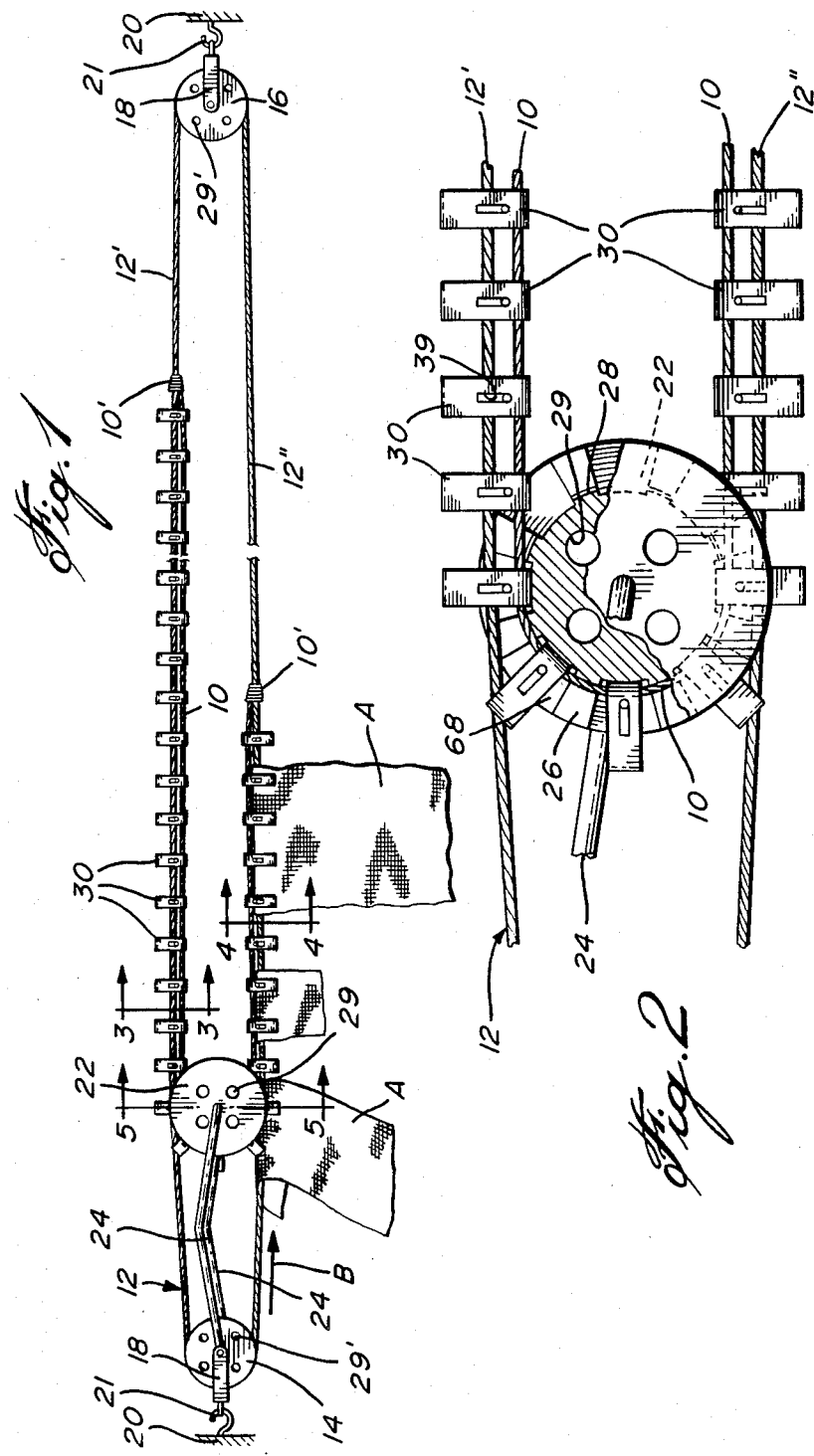

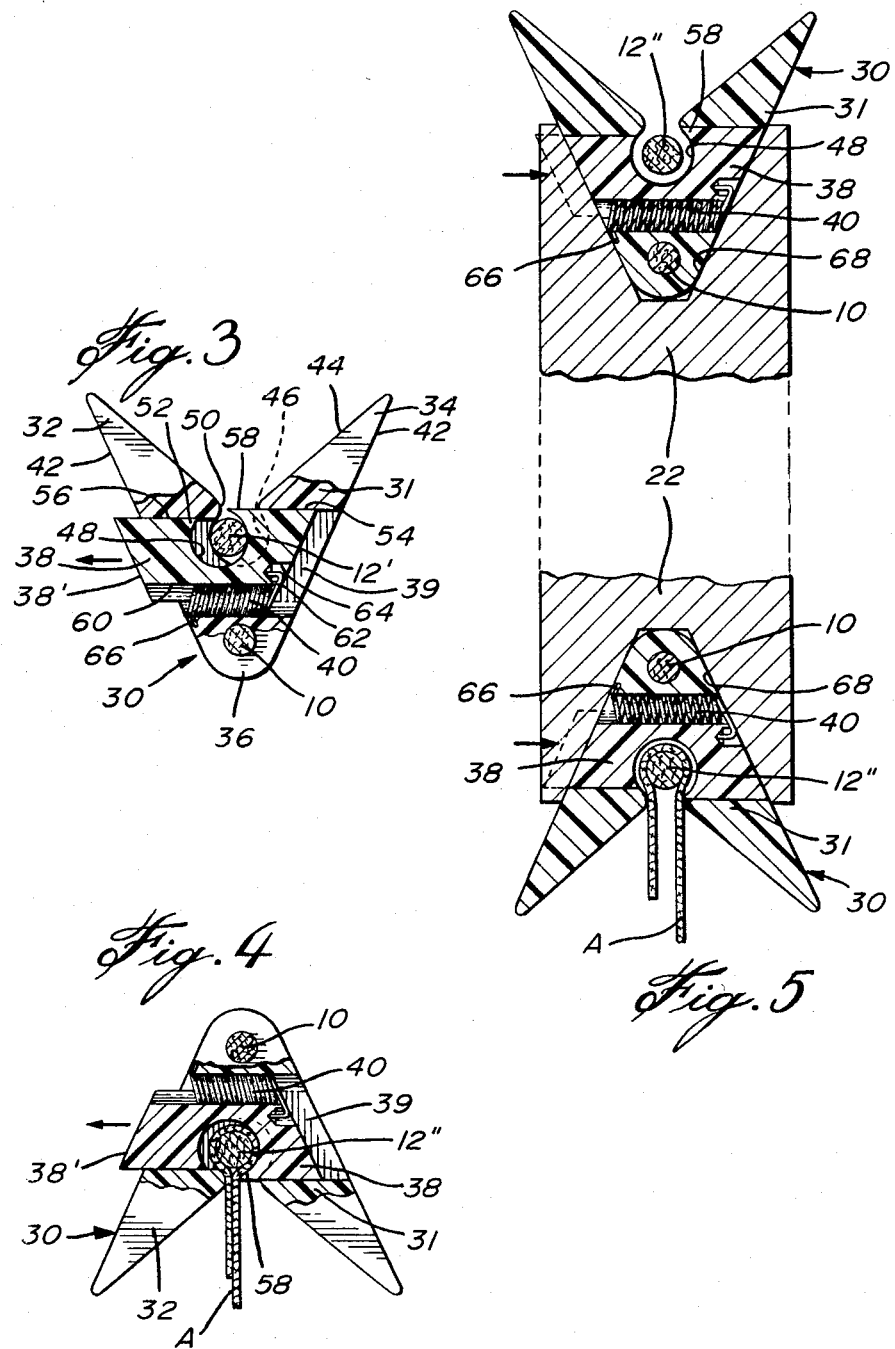

CLOTHES-LINE

FIELD OF THE INVENTION

The invention relates to clothes-lines and, more particularly, to means for securing garments on the clothes-line.

BACKGROUND OF THE INVENTION

In conventional clothes-line assemblies, it has always been cumbersome to maually secure each garment onto the clothes-line with clothes pins. The clothes must be hung on the line and then secured manually, and these clothes pins must also be removed manually and stored away when the dry garments are taken in.

In Migel—U.S. Pat. No. 3,656,630 dated Apr. 18, 1972, there are described means to individually present the clothes pins at a selected location adjacent the clothes-line for the user to manually force the clips over the garment draped over the clothes-line. This system facilitates handling of the clothes pins but still requires manual clipping and unclipping of the garments.

OBJECTS OF THE INVENTION

It is therefore the prime object of the invention to provide an endless clothes-line suspended between two fixed supports with means to automatically present clothes pins onto garments previously draped over the clothes-line.

It is another object of the invention to provide the clothes-line with a series of normally-closed clips and with a sprocket wheel that will automatically open the clothes pins when the latter travel around the sprocket wheel.

SUMMARY OF THE INVENTION

The clothes line assembly of the present invention includes an endless clothes-line stretched out between two pulleys and provided with a sprocket wheel located between the two pulleys and in the plane of the latter and held nearer the pay-out pulley. The sprocket wheel has a number of V-shape recesses at its periphery. Clothes pins engage the clothes-line and are fixedly connected in equally-spaced-apart relation to a cable, both ends of which are secured to the clothes-line, said cable being trained on the sprocket wheel. The clothes pins automatically disengage the clothes-line when travelling around the sprocket wheel along with the cable. The movement of the clothes-line will impart rotation of the sprocket wheel to successively present a clothes pin in operative relation to the line for automatically securing thereto garments placed thereon. Each clothes pin is preferably V shape, with a central, transversely-slidable locking plate spring biased to a closed position with one end protruding from the clothes pin. The clothes pin has an enlarged clothes-line receiving notch at its head portion that is normally closed by the locking plate. When the clothes pin engages the sprocket recess, the locking plate is inwardly pushed by coming in contact with one side wall of the recess, thereby opening the clothes pin notch to allow the latter to be engaged by the clothes-line.

BRIEF DESCRIPTION OF THE DRAWINGS

FIG. 1 is a side view of the clothes-line assembly of the invention;

FIG. 2 is an enlarged partial side view of the clothes line assembly showing the sprocket wheel partially in section;

FIG. 3 is a section taken along line 3—3 of FIG. 1 and showing a clothes pin partially in section;

FIG. 4 is a section taken along line 4—4 of FIG. 1 and showing a clothes pin partially in section;

FIG. 5 is a broken cross-sectional view taken along line 5—5 of FIG. 1;

DETAILED DESCRIPTION OF THE DRAWINGS

Figure 6:
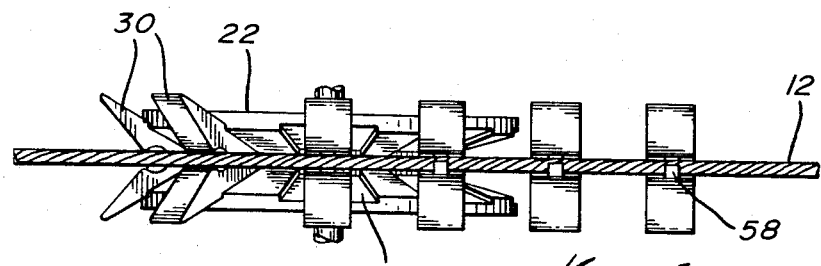
FIG. 6 is a top plan view of the sprocket wheel and of part of the clothes-line.

Referring to FIGS. 1 and 2, the clothes-line assembly comprises a cable 10 attached at both ends by knots 10' to and extending along an endless clothes-line 12, which is trained on spaced pulleys 14 and 16, the yokes 18 of which are pivotally attached to spaced supports 20 by hooks 21. In between the two pulleys 14 and 16, and nearer the line pay-out pulley 14, a sprocket wheel 22 is held in the plane of the two pulleys by bent struts 24, which join the axles of the line pay-out pulley 14 and of the sprocket 22.

Sprocket 22 has a V-shape peripheral groove 26 on the bottom 28 of which is trained cable 10, while the top and bottom runs 12' and 12" respectively of the clothes-line 12 extend freely within the groove 26 and tangentially of the sprocket 22 on diametrically-opposite sides of the latter. As clothes-line 12 is manually pulled one way or the other, cable 10 attached to line 12 and trained on sprocket 22 will rotate the latter accordingly. The sprocket wheel 22 and pulleys 14, 16 may be transversely perforated as a weight-reducing measure, as shown by holes 29 and 29', respectively.

A number of clothes pins 30 are fixedly connected to the cable 10 at equal distances along the same and are arranged to releasably clip onto the line 12 for removably securing garments A draped over line 12. As will be explained shortly, clothes pins 30 open up as a result of travelling with cable 10 around sprocket wheel 22, but these clothes pins 30 are otherwise closed on clothes-line 12 when free of sprocket wheel 22. In FIG. 3, a clothes pin 30 is shown in its closed position on the line top run 12', and in FIG. 4, the clothes pin clips a garment A on the line lower run 12".

As illustrated, each clothes pin 30 is made essentially of three parts: a V-shape body 31 having two legs 32, 34 and a head 36; a trapezoidal locking plate 38 which is slidable within a transverse through bore 39, made in the head 36 of pin body 31; and a transversely-extending spring 40 for outwardly biasing the locking plate 38 to closed position.

Body 31 is flat and has lateral flat faces 42 at which bore 39 opens. Legs 32, 34 define a V-shape space 44, the apex of which opens within a circular notch 46 made in head 36 and extending across bore 39. Locking plate 38 has a simiarly-shaped notch 48 which fully registers with head notch 46 in the open position of locking plate 38. In said open position, the ends of the latter are flush with lateral faces 42 of body 31, as shown in FIG. 5. Notches 46 and 48 each have a throat 50, 52 respectively of restricted width but wide enough the passage of line 12 and of any garment A draped thereon. In the closed position of locking plate 38, the two notches 46, 48 are out of register; and line 12 or line 30 with garment A are clipped by clothes pin 30, as shown in FIGS. 3 and 4, respectively. To obtain a better grip, longitudinal edge portions 54 of locking plate 38 are offset relative to the longitudinal edge portion 56 in the direction of the tips of legs 32, 34, so as to define a throat lip 58 which is biased by spring 40 against the root of leg 32, so that garment A will be positively squeezed between leg 32 and lip 58, as shown in FIG. 4. This also provides a positive stop limiting the closing movement of locking plate 38.

Spring 40 is a tension coil spring which extends within bore 39 and partly within a groove 60 made in locking plate 38 and adjacent the apex of the head 36. One end 62 of spring 40 is bent to engage a cavity 64, made in locking plate 38, while the other end 66 of spring 40 is bent to engage a blind bore in body 31. Spring 40 biases locking plate 48 to open position, in which end 38' of locking plate 38 protrudes from one lateral face 42 of clothes pin body 31.

Figure 7:
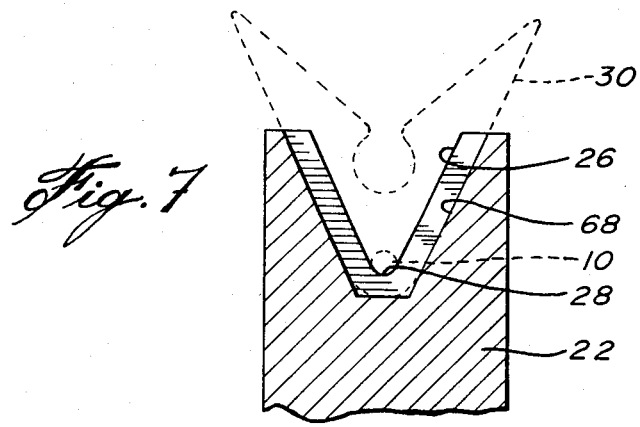
FIG. 7 is a partial cross-section of the sprocket wheel showing one of its clothes pin receiving recesses, with a clothes pin shown in dotted line fitted therein.
Figure 8:
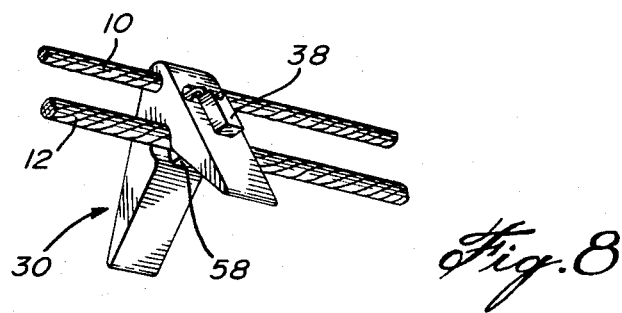
FIG. 8 is a perspective view of a clothes pin as carried by the cable and engaging the clothes-line.

The clothes pin head 36 is bored perpendicularly to the plane of the pin to frictionally receive the cable 10. The clothes pins 30 are equally spaced along cable 12. Groove 26 of sprocket wheel 22 is provided with enlarged recesses 68, as shown in FIGS. 6 and 7. These recesses extend in the bottom 28 of groove 26 as well as in the side faces thereof. These recesses 68 are radially directed and their lateral portions flared radially outwardly. The recesses 68 are equally spaced around the periphery of the sprocket wheel 22 and their spacing at the level of the bottom of groove 26 is substantially equal to the spacing of clothes pin 30 along the cable 10. The diameter of bottom 28 of groove 26 of the sprocket wheel 22 is substantially equal to the bottom of the clothes-line receiving groove of the pulleys 14 and 16.

As shown in FIGS. 1 and 2, the cable 10 is tensioned around the sprocket wheel 22 and therefore maintains the heads 36 of the clothes pin bodies 31 inwardly directed within the loop formed by the clothes-line 12.

Upon rotation of clothes-line 12, the heads of the pins successively and progressively enter the recesses 68 of the sprocket wheel 22. During this movement, the protruding end 38' of locking plate 38 slidably engages the lateral surface of the V-shape groove 26 of the sprocket wheel 22 and, therefore, the locking plate is moved transversely of the clothes pin to open position. Further rotation of the clothes pin with the sprocket wheel around the same causes the clothes-line 12 to clear the open clothes pin.

The clothes-line assembly is used as follows: when one wishes to place garments on the clothes-line for drying, the garments A are successively draped over the clothes line lower run 12" on the portion of this lower run extending between pay-out pulley 14 and sprocket wheel 22 and the clothes-line lower run 12" is pulled in the direction of arrow B of FIG. 1. Rotation of the sprocket wheel causes successive clothes pins to engage both the clothes-line and the garment A draped thereon and the successive clothes pins automatically grip the garment and the clothes-line upon their release from the sprocket wheel. When the garments are dried out, the clothes-line is pulled in the opposite direction, whereby the garments become unclipped as the clothes pins at the lower run of the clothes-line successively engage the sprocket wheel, whereby the garments can be removed from the line bottom run in the space between the sprocket wheel and the line pay-out pulley 14.

If desired, a cover may be supported by struts 24 to cover the sprocket wheel 22 and also, if desired, the pay-out pulley 14 to obtain a more care-free operation.

What I claim is:

1. A clothes-line and clothes pin assembly comprising:
   (a) a first and a second pulley each adapted to be supported at horizontally-spaced-apart points;
   (b) an endless clothes-line stretched out and trained on said pulleys to form upper and lower runs;
   (c) a sprocket wheel rotatably supported in the plane of said line and held nearer said first pulley than said second pulley;
   (d) a cable secured at both its ends to said clothes-line, trained around said sprocket wheel and extending alongside said clothes-line, a horizontal portion of the lower run of said clothes-line extending between said first pulley and said sprocket wheel forming a cable-free loading and unloading zone, so that garments may be draped over said line and removed therefrom, said zone at one end forming a junction with said cable where the latter joins with said lower run;
   (e) a row of spaced-apart clothes pins, each fixedly connected to said cable and each carrying a line-gripping means movable relative to its clothes pin between a line-gripping and a line-releasing position, each clothes pin further carrying a biasing means biasing said line-gripping means to line-gripping position, said clothes pins successively engaging said sprocket wheel when travelling with said cable around said sprocket wheel, and the latter having a surface means contacting said gripping means and moving the latter to the line-releasing position when said clothes pin is engaging said sprocket wheel, whereby movement of said lower run of said line will impart rotation to the sprocket wheel to successively present clothes pins at said junction with their gripping means in line-releasing position for engaging the lower end of said line together with a garment draped thereon, said clothes pin automatically securing said garment on said line when said clothes pin leaves said sprocket wheel.

2. The assembly of claim 1, wherein each clothes pin comprises a flat V-shape member including a head portion and two legs, said head portion being bored to frictionally receive said cable with said V-shape member extending perpendicularly to said cable, said legs defining a V-shape space therebetween, having an apex portion defining a first notch for receiving said clothes-line, said gripping means including a locking plate slidably mounted within a transverse bore of said head portion for transverse movement relative to said head portion between a gripping position and line-releasing position, said locking plate having a line-receiving notch which is misaligned with said first notch in said line-gripping position and aligned with said notch in said line-releasing position, respectively, said biasing means comprising of a spring means located within said bore and attached to said locking plate to line-gripping position, said locking plate in said line-gripping position having an end portion protruding from one side of said head portion of said V-shape member, said sprocket wheel having a peripheral groove for receiving said cable and a plurality of V-shape recesses made in said groove for receiving said clothes pins with said end portion of said locking plate engaging one side surface of one of said recesses to cause retracting movement of said locking plate to line-releasing position.

3. The assembly of claim 1, wherein said first pulley and said sprocket wheel have axles and further including strut members joining the axles of said first pulley and of said sprocket wheel.

4. The assembly of claim 2, wherein said locking plate has on one side of its line receiving notch a longitudinal edge which is offset with respect to a longitudinal edge on the other side of said line receiving notch in the direction of the tips of said legs, to thereby define a lip portion which abuts against one of the legs in the line-gripping position of said locking plate.

* * * * *